UNITED STATES PATENT OFFICE.

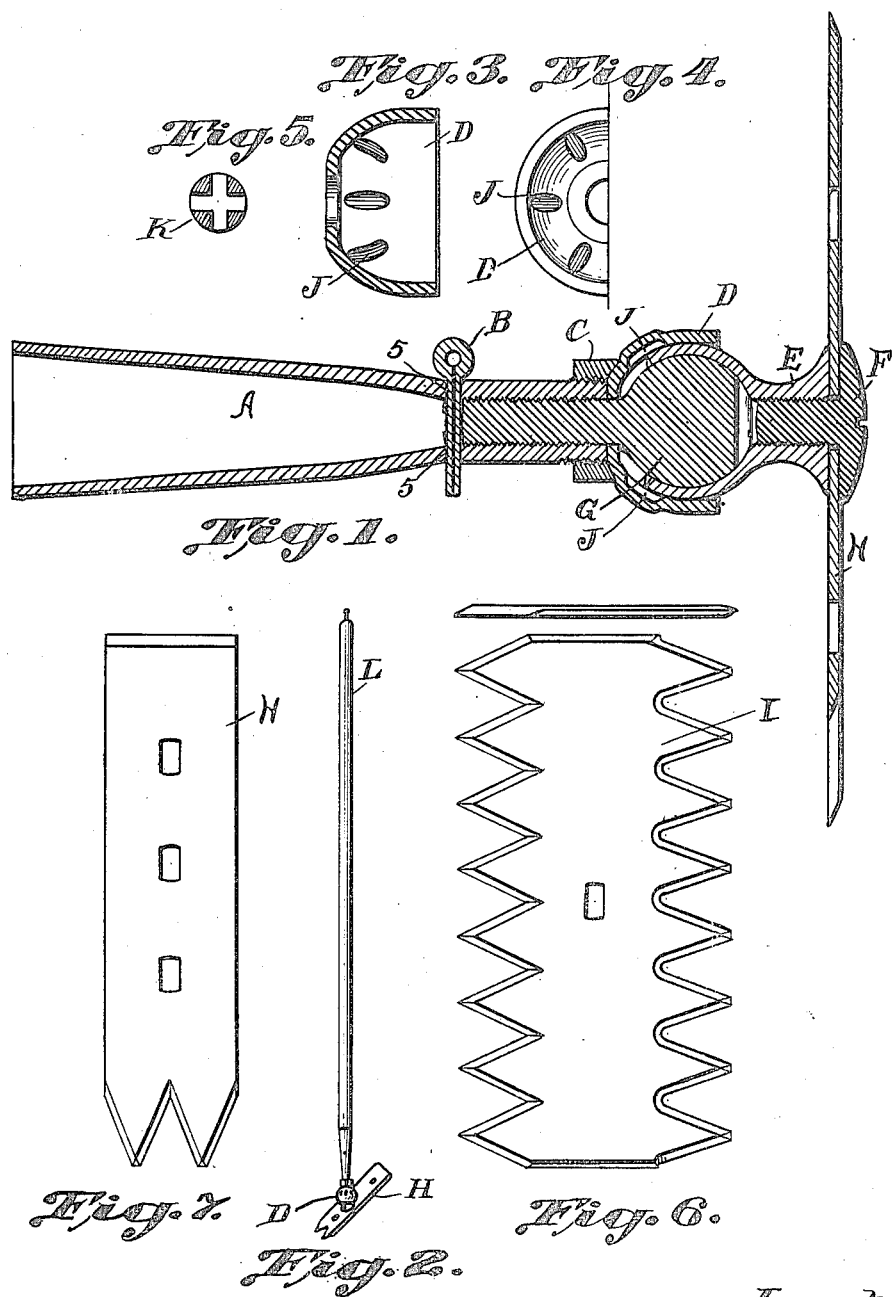

GEORGE DE WITT WILLARD, OF SPEARFISH, SOUTH DAKOTA.

COMBINATION HOE AND IMPLEMENT.

1,239,653.  Specification of Letters Patent.  Patented Sept. 11, 1917.

Application filed October 30, 1916. Serial No. 128,423.

*To all whom it may concern:*

Be it known that I, GEORGE DE WITT WILLARD, a citizen of the United States, and a resident of Spearfish, in the county of Lawrence and State of South Dakota, have invented certain new and useful Improvements in Combination Hoes and Implements, of which the following is a specification.

My invention relates to improvements in combination hoe and implement for cultivation and other purposes and the objects of my improvements are:

First, to provide a universal joint so the handle can be placed in any position of inclination to the blade.

Second, to provide blades with teeth, with cutting edges and holes for adjusting for different uses.

Third, to reduce the friction of the blades in passing through the soil.

Fourth, to provide an implement that produces the same results as many and at less cost.

Fifth, to provide an implement that will remove weeds and cultivate between plants that are only one-half inch apart in row without disturbing the plants.

I attain these objects by the mechanism illustrated in the accompanying drawings in which Figure 1 is a longitudinal sectional view of the entire implement excepting handle. Fig. 2 is a perspective view of the complete implement. Figs. 3 and 4 are views of dust-cap showing recesses for containing grease and for causing friction. Fig. 5 is an end view of shank of ball element, G showing crossed grooves for receiving cotter pin B, for locking purposes. Figs. 6 and 7 are the two kinds of blades that are used.

Fig. 1, A is a conical, tubular socket ferrule reinforced by thickening its smaller end for threading externally and internally for locking and holding purposes, with holes at 5 to admit spring cotter B for holding universal joint in position in severe uses, such as pruning, or mowing brush, or large weeds. C is a locking nut for forcing dust-cap D securely over socket element E thereby locking the socket element E carrying blade H in any position required. D is a dust-cap with recesses shown at J J in Fig. 1 and also J in Figs. 3 and 4 for containing grease and also increasing friction on socket element E. E is a socket element with a threaded hole at forward end for receiving holding screw F for securing blade to socket element E. G is a ball element with a threaded shank extending rearwardly for engaging ferrule element A, said shank having crossed grooves milled at rear end for receiving cotter or pin B. The crossed grooves are shown at K, Fig. 5.

Fig. 7, H is a blade with holes placed at several positions for the purpose of adjusting for different uses such as cutting small limbs from trees or removing plants from lawns or cultivation in narrow places.

Fig. 6, I is a blade with a double row of teeth placed on opposite edges for the purpose of pulverizing the soil as it passes over the blade, also having one side sharp for mowing and the other blunt for cultivation on gravelly or stony soil.

Fig. 2, L is a perspective view of the complete implement.

I claim:

1. An implement comprising a handle and a tubular ferrule internally and externally threaded, a ball element with a threaded shank engaged within the ferrule, a removable pin passed through said ferrule and shank, mating clamp elements carried by said ball and a nut carried by the external threads on the ferrule and engaging the clamp elements.

2. A universal connection for implements comprising a socket ferrule, a ball having a shank engaged in the ferrule mating clamp elements embracing said ball, one of said elements being provided with grease receiving recesses in its inner surface and means on the ferrule for frictionally locking the clamp elements in adjusted position.

3. An implement with a suitable handle with a reinforced tubular socket ferrule with locking and holding devices, comprising a ball element containing a threaded shank with cross slots milled in rearward end and receiving spring cotter or pin for the purpose of holding said ball element in position, clamping elements on said ball comprising a hemispherical dust-cap with recesses for containing grease and producing friction on a mating socket element, said mating element being provided with a shoulder for engaging blade and with a threaded hole in center of shoulder for receiving an oval headed screw for securing said blade to the socket element.

GEORGE DE WITT WILLARD.